(12) United States Patent
Chen

(10) Patent No.: US 8,488,449 B1
(45) Date of Patent: *Jul. 16, 2013

(54) MANAGING NETWORK TRAFFIC USING FLOATING POINT FORMAT VALUES

(75) Inventor: Li-Sheng Chen, Petaluma, CA (US)

(73) Assignee: DinoChip, Inc., Petaluma, CA (US)

( * ) Notice: Subject to any disclaimer, the term of this patent is extended or adjusted under 35 U.S.C. 154(b) by 614 days.

This patent is subject to a terminal disclaimer.

(21) Appl. No.: 11/870,139

(22) Filed: Oct. 10, 2007

Related U.S. Application Data

(63) Continuation of application No. 10/737,461, filed on Dec. 15, 2003.

(51) Int. Cl.
*H04L 12/26* (2006.01)
*H04L 12/28* (2006.01)

(52) U.S. Cl.
USPC .......... 370/229; 370/230; 370/231; 370/254; 370/392

(58) Field of Classification Search
USPC .......................................... 370/254, 230, 231
See application file for complete search history.

(56) References Cited

U.S. PATENT DOCUMENTS

| | | | | | |
|---|---|---|---|---|---|
| 5,859,835 | A | * | 1/1999 | Varma et al. | 370/229 |
| 5,867,722 | A | * | 2/1999 | Whitted et al. | 712/1 |
| 6,205,151 | B1 | * | 3/2001 | Quay et al. | 370/416 |
| 6,301,226 | B1 | * | 10/2001 | Lincoln | 370/229 |
| 6,404,768 | B1 | * | 6/2002 | Basak et al. | 370/395.7 |
| 6,741,565 | B1 | * | 5/2004 | Wicklund | 370/234 |
| 6,829,218 | B1 | * | 12/2004 | Chen et al. | 370/230 |
| 2004/0228367 | A1 | * | 11/2004 | Mosig | 370/503 |

OTHER PUBLICATIONS

Parlante, Nick "Linked List Basics" 2001.*

* cited by examiner

*Primary Examiner* — Dang Ton
*Assistant Examiner* — Robert M Morlan
(74) *Attorney, Agent, or Firm* — Aka Chan LLP

(57) ABSTRACT

A technique to implement a network traffic management system with an integrated multidimensional floating point sorter is to store data such that it may be retrieved in a sorted fashion. Entries are stored into a memory according to time stamp value, represented in a floating point format, and the time stamp value is divided into at least two portions, exponent and mantissa. The memory is organized as a pointer memory. An integrated multidimensional floating point sorter may be implemented using integrated circuit technology using one or more integrated circuits. These integrated circuits may be used in management of network traffic, and provides quality of service (QoS) or class of service (CoS) control.

20 Claims, 9 Drawing Sheets

The Four Versions of Head and Body (3 bit TS layer Example)

Ver. 1

Combine Head and Body

Ver. 2

Separate Head and Body

PB: A pointer points to 1st location of Body

Pt_a, Pt_b: Pointer to next TS layer

MANAGING NETWORK TRAFFIC USING FLOATING POINT FORMAT VALUES

CROSS-REFERENCE TO RELATED APPLICATION

This application is a continuation of U.S. patent application Ser. No. 10/737,461, filed Dec. 15, 2003, which is incorporated by reference along with all other references cited in this application.

BACKGROUND OF THE INVENTION

The present invention relates generally to the field of computer and data networking, and more particularly, to techniques to more efficiently process the data packets of a network.

Computer networking is one of the most important technologies in the information age. Personal computers are on the desks of most business people and majority of homes in the United States, and also becoming more commonplace throughout the world. Computers are instrumental for facilitating electronic commerce and internet traffic. Computers are typically connected using a network that allows the sharing or transfer of data between computers and devices. This data may include computer files, e-mail, images, audio, video, real-time data, and other types of information. For example, when their computers are joined in a network, people can share files and peripherals such as modems, printers, tape backup drives, or CD-ROM drives. When networks at multiple locations are connected, people can send e-mail, share links to the global internet, or conduct videoconferences in real time with other remote users. Local area network (LANs) are used to connect computers within businesses and homes. The internet is typically used to connect individual computers and other networks, including local area networks.

Each computer has a set of predefined network ports, which act as mailboxes for incoming and outgoing messages. The ports are typically configured to support a particular network protocol, and hence to receive or send a type of packet that is compatible with the protocol. For example, one common port is the UDP (user datagram protocol) port, which provides a channel into the computer for datagram packets that are communicated using TCP/IP (transport control protocol/internet protocol). Datagram packets are sent to a specific UDP port by using a programming interface, such as "sockets." Sockets are a programming interface originated on Unix operating systems that allows network communication using a file I/O metaphor.

Despite the success of computer networks, there is continuing development to improve networking technology, especially since network traffic continues to rapidly grow. For example, it is desirable to increase transmission speed and network processing speed. This will allow more users to transfer greater amounts of data. Faster processing will allow better and faster filtering of network traffic so that, for example, selected users will receive better response times. Further, it is important to improve security on networks, which has become a high priority. Better and faster network processing will allow improved filtering to prevent security breaches and transmission of computer viruses.

Integrated circuits are the building blocks of electronic devices and networks, including computers, personal digital assistants (PDAs), mobile and other telephony devices, digital cameras and video cameras, digital voice recorders, routers, switches, and network hubs. Some types of integrated circuit include microprocessors, memories, programmable logic devices (PLDs), and application specific integrated circuits (ASICs). As integrated circuit technology improves, it becomes possible to put more and more functionality on single integrated circuits.

As can be appreciated, there is a need for improvements in computer networking, especially for techniques to improve processing and speed of processing networking information.

BRIEF SUMMARY OF THE INVENTION

The invention provides techniques to implement a network traffic management system, and in particular an integrated multidimensional sorter where data is stored such that it may be retrieved in a sorted fashion. Entries are stored into a memory according to a time stamp value, represented in a floating point format. The time stamp value consists of a mantissa (or fraction), an exponent, and an assumed radix (or base). The radix may be 2, 8, 10, 16, or any other number. The time stamp value, mantissa, and exponent may be signed or unsigned or represented in two's complement. Many different representations can be used for floating point numbers, such as the IEEE (single-precision and double-precision), IBM, Cray Computer Corporation, Control Data Corporation, and DEC VAX formats. Any of theses floating point representations may be used as a time stamp of the invention.

In a specific implementation, the memory is organized as a pointer memory. An integrated multidimensional floating point sorter (FPS) may be implemented using integrated circuit technology using one or more integrated circuits. The technique is efficient and allows processing (sorting) of a large amount of data, with minimal impact on throughput of the data through the system. These integrated circuits may be used in management of network traffic, and provides quality of service (QoS) or class of service (CoS) control.

In an embodiment, the invention is an integrated circuit including M sorter blocks, where each sorter block has a user-selectable number of entries of one or more entries. Each entry has a time stamp value and a connection value, there are a total of N entries for all the M sorter blocks, and M is an integer 2 or greater. M may be user-selectable. When a first sorter block may be configured to have Y entries, there are M−1 remaining sorter blocks which have at most a total of (N−Y) entries. When a second sorter block is configured to have Z entries, the sorter blocks, not including the first and second sorter blocks, have at most (N-Y-Z) entries.

In operation, upon receiving a first packet of information on a first port, a first time stamp (i.e., a first exponent and a first mantissa) and a first connection value are stored in a first entry of a first sorter. Upon receiving a second packet of information on the first port, a second time stamp (i.e., a second exponent and a second mantissa) and a second connection value are a second entry of the first sorter. Upon receiving a third packet of information on a second port, a third time stamp (i.e., a third exponent and a third mantissa) and a third connection value are stored in a first entry of a second sorter. Upon receiving a fourth packet of information on the second port, a fourth time stamp (i.e., a fourth exponent and a fourth mantissa) and a fourth connection value are stored in a second entry of the second sorter.

In another embodiment, the invention is an integrated circuit including a first sorter block portion of the integrated circuit comprising N(1) entries, where each entry includes a connection value and a time stamp value. Entries in the first sorter block are sorted according to their time stamp value, and the number of entries N(1) is user-selectable.

A second sorter block portion of the integrated circuit includes N(2) entries, where each entry includes a connection value and a time stamp value. Entries in the second sorter block are sorted according to their time stamp value, and the number of entries N(2) is user selectable.

In another embodiment, the invention is an integrated circuit including first control circuitry to implement a first sorter block comprising N(1) entries, where each entry includes a connection value and a time stamp value. Entries in the first sorter block are sorted according to their time stamp value, and the number of entries N(1) is user-selectable. Second control circuitry to implement a second sorter block includes N(2) entries, where each entry comprises a connection value and a time stamp value. Entries in the second sorter block are sorted according to their time stamp value, and the number of entries N(2) is user-selectable.

In another embodiment, the invention is an integrated circuit including control circuitry to implement M sorter blocks, where each sorter block has a user-selectable number of entries of one or more entries. Each entry has a time stamp value and a connection value. There are a total of N entries for all the M sorter blocks, and M is an integer 2 or greater.

In another embodiment, the invention is a method of receiving a first entry to be stored in a memory location, where the first entry has a time stamp value and a data value. The time stamp value of the first entry is divided into at least two portions, an exponent portion and a mantissa portion.

A first pointer memory structure is provided and referenced using a first pointer address and having a head and a body, where the head comprises a bit map field and a pointer-to-body field. A second pointer memory structure is provided and referenced using a second pointer address and having a head and a body, where the head comprises a bit map field and a pointer-to-body field. The second pointer address is stored at a location in the body of the first pointer memory structure based on the exponent portion of the time stamp. The location of the second pointer address is indicated in the bit map field of the head of the first pointer memory structure. The first entry address is stored at a location in the body of the second pointer memory structure based on the mantissa portion of the time stamp. The location of the first entry address is indicated in the bit map field of the head of the second pointer memory structure.

In another embodiment, the invention includes a method of receiving an entry having a binary time stamp and data value. The binary time stamp is converted to a time stamp represented in a floating point format, having a first time stamp portion and second time stamp portion.

A first pointer memory structure is provided and referenced using a first pointer address and having a head and a body, where, for example, the head has a bit map field with two or more bits and the body has two or more memory positions. Each bit in the bit map field represents one of the two or more memory positions. The two or more bits of the head of the first pointer memory structure are initialized to a first state.

When storing a second pointer address in a first memory position of the two or more memory positions, a first bit of the two or more bits of the head of the first pointer memory structure is changed to a second state. When storing the second pointer address in a second memory position of the two or more memory positions, a second bit of the two or more bits of the head of the first pointer memory structure is changed to the second state.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
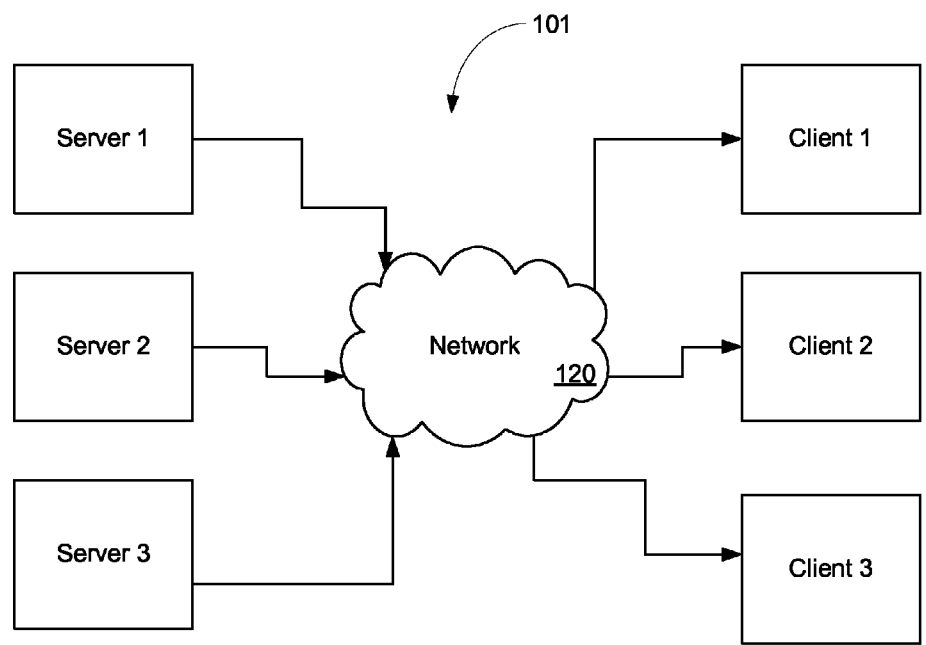
FIG. 1 shows a computer network system within which the present invention may be embodied.

FIG. 1 shows a computer network system 101 within which the present invention may be embodied. There may be any number of servers and clients in the system. For example, there may be thousand or even millions of servers and clients. In this system, there are three servers, server 1, server 2, and server 3, and there are three clients, client 1, client 2, and client 3. The servers communicate with the clients by exchanging packets over a network 120. The computer network system is representative of many different environments including a LAN system, a wide area network (WAN) system, and an internet system.

A network generally includes: (1) at least two computers, (2) a network interface or network interface card (NIC) on each computer, (3) a connection medium, and (4) network operating system software. The NIC is a device that lets the computer talk to the network. The connection medium is usually a wire or cable, although wireless communication between networked computers and peripherals is also available. Some examples of network operating systems software include Microsoft Windows 95 or Windows NT, Novell NetWare, AppleShare, or Artisoft LANtastic.

Most networks include a hub or switch. Hubs, or repeaters, are simple devices that interconnect groups of users. Hubs forward any data packets—including e-mail, word-processing documents, spreadsheets, graphics, print requests—they receive over one port from one workstation to all their remaining ports. All users connected to a single hub or stack of connected hubs are in the same "segment," sharing the hub bandwidth or data-carrying capacity. As more users are added to a segment, they compete for a finite amount of bandwidth devoted to that segment.

Switches are smarter than hubs and offer more dedicated bandwidth to users or groups of users. A switch forwards data packets only to the appropriate port for the intended recipient, based on information in each packet header. To insulate the transmission from the other ports, the switch establishes a temporary connection between the source and destination, and then terminates the connection when the conversation is done.

A router links a local network to a remote network. On the internet, a router is a device or, in some cases, software in a computer, that determines the next network point to which a packet should be forwarded toward its destination. The router is connected to at least two networks and decides which way to send each information packet based on its current understanding of the state of the networks it is connected to. A router is located at any gateway (where one network meets another), including each Internet point-of-presence. A router is often included as part of a network switch.

A router may create or maintain a table of the available routes and their conditions and use this information along with distance and cost algorithms to determine the best route for a given packet. Typically, a packet may travel through a number of network points with routers before arriving at its destination. Routing is a function associated with the network layer (layer 3) in the standard model of network programming, the Open Systems Interconnection (OSI) model. A layer-3 switch is a switch that can perform routing functions.

Figure 2:
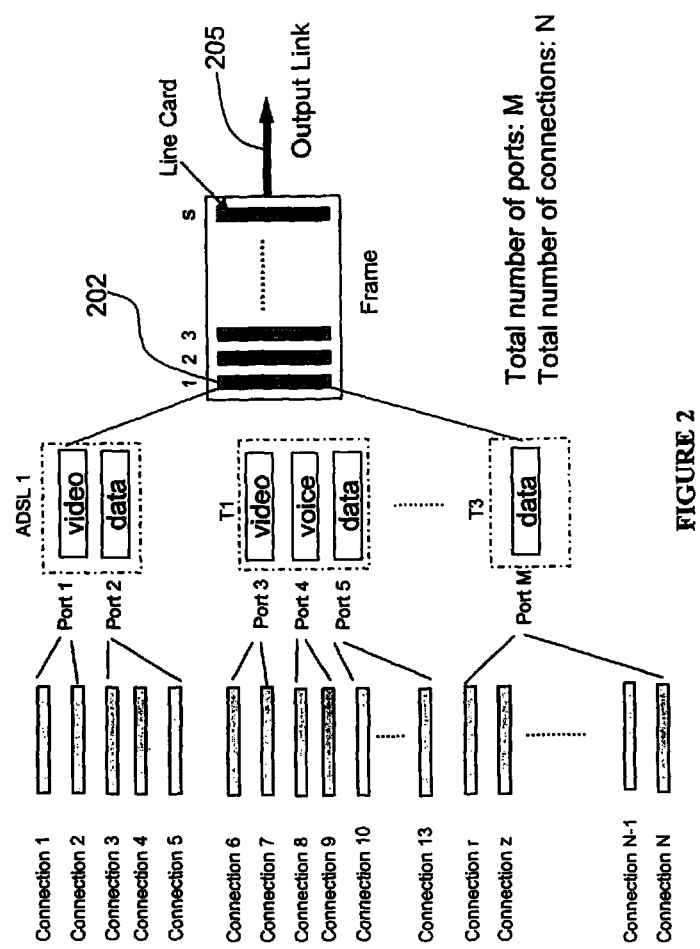
FIG. 2 shows a switch or router used to connect a number of ports and connections of a network, such as at a telephone company's central office.

FIG. 2 shows a switch or router 202 used to connect a number of ports and connections to a network, such as network 120, using an output link 205. ADSL, T1, and T3 are some examples of types of broadband connections. Each port may be allocated for a particular type of information such as video, voice, or data. There are M total ports (may also referred to as a sorters in this document) and N total connections (may also be referred to as entries in this document). M and N are integers. The ports are numbered 1 through M, and the connections are numbered I through N. Each port has a number of connections associated with it. Specifically, port I has N(1) connections. So, port 1 has N(1) connections, which is two; port 2 has N(2) connections, which is 3; and port M has N(M) connections.

Each connection or entry stores the information of a packet. This connection data may be held in a memory such as a random access memory (RAM) or pointer memory data structure. This data includes the packet information and a time stamp of the packet. The time stamp, represented in floating point format in an implementation of the invention, gives the time that the packet was received. The packet information may also be referred to as packet data, connection value, or payload. In operation, many packets are received at a port at different times and these will be stored in entries. The packets in the entries will then be passed out of the port. There are various techniques to prioritize which entries are sent out first. Generally, the earlier received packets are sent out first. So, the packets with the lowest time stamp will be sent out first. The packet with the minimum time stamp has the highest priority. Other priority schemes may also be used. For example, in the alternative, the most recently received packets may be sent out first. In this case, the packets with the highest time stamp will be sent out first.

To implement such priority schemes, the entries for a particular port are sorted by time stamp to determine which time stamps will be sent out of the port first. To prioritize to send out earliest received entries first, the entries will be sorted so time stamps are from lowest to highest. Each port is sorted individually, which means the entries for port I will be sorted independently of port 2 and the other ports. And the entries in port 2 will be sorted independently of port 1 and the other ports. Therefore, each port may be referred to as a sorter because the entries associated with a particular sorted are sorted independently of the other sorters.

Some sorting techniques are binary tree and heap sort. Other sorting algorithms may also be used. Sorting the entries will typically take several memory cycles to complete.

In an implementation of the invention, the number of ports or connections, or both, are user-selectable. For example, a user may configure or program the device to have one port, two ports, three ports, or four ports or more. Furthermore, the user may also configure or program the device to have three connections in the first port, two connections for the second port, or any number of connections for a specific port that is permitted by the design. There are different techniques of designing a device to allow for user-configurability. For example, a user may configure the device by placing the appropriate signals at particular pins or by loading the appropriate bits into flip-flops, registers, storage, or memory cells of the device. Perhaps electrically erasable (EEPROM) or Flash memory cells may be used to allow for nonvolatile storage of the user's configuration. Or static RAM (SRAM) or dynamic RAM (DRAM) cells may be used to allow for volatile storage of the user's configuration.

There may be any number of connections, which may be user selectable, assigned to each port. For example, port 1 of FIG. 2 is for ADSL 1 video and has two connections, connection 1 and 2. Port 5 is for T1 data and has four connections, connections 10, 11, 12, and 13. In an implementation, the total number of connections N may be divided in any desired way among the ports. For example, if N is 64K and there are two ports, if port 1 has 25 connections, then port 2 may have at most 64K-25 connections.

Generally, the number of ports a user selects will depend on the number of devices a user will be using. The number of connections will generally be allocated according to bandwidth, where the greater bandwidth ports will have more connections. For example, a Ti video connection has greater bandwidth than an ADSL voice connection, and therefore will usually have a greater number of connections. As can be appreciated, as N and M increase, the circuitry to implement the sorters and entries becomes more complicated.

Alternatively, in another implementation of the invention, rather than user-selectability, a device may be designed with fixed number of ports and connections, and the user may choose to not use all the available ports and connections. In another implementation, the features such as the number of ports and connections of the device may be configured by selecting the appropriate masks during fabrication. This may be referred to as factory programmability.

Figure 3:
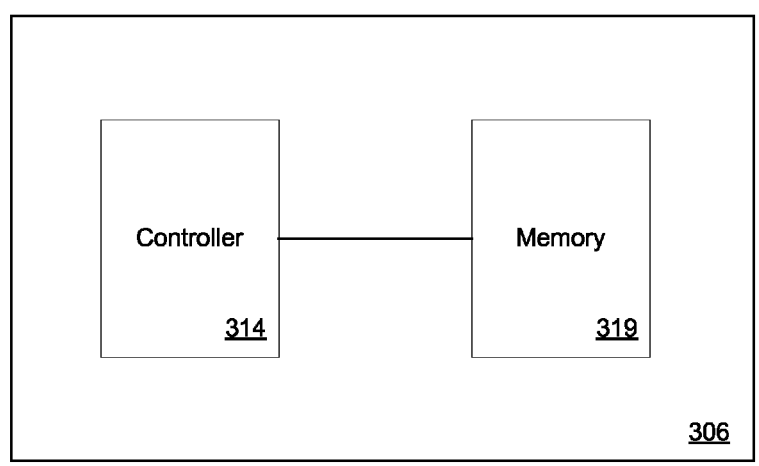
FIG. 3 shows an integrated circuit or chip with a controller or control circuitry portion and memory portion.

The ports (sorters) and connections (entries) may be implemented using one or more integrated circuits. In one embodiment, the sorters and entries are implemented using a single integrated circuit. FIG. 3 shows an integrated circuit or chip 306 with a controller or control circuitry portion 314 and memory portion 319. The control circuitry is connected to the memory. The control circuitry implements the sorters and entries while the memory provides the storage for the entries. For example, the control circuitry would implement the user-selectability feature of the number of sorters and entries. In an embodiment of the invention, M is at least two, so there are two or more sorters on a single integrated circuit. The invention may be referred to as an integrated multidimensional FPS. The integrated circuit be a PLD or field programmable gate array (FPGA) or ASIC, or a custom-designed integrated circuit.

In an alternative implementation, the controller 314 and memory 319 are on separate integrated circuits. Integrated circuits 314 and 319 could be connected using traces of a PC board or may be a wire or cable. The integrated circuits may be on different electronic boards or even in different locations, being connected by a network or modem. The memory may be, for example, a static RAM (SRAM) or dynamic RAM (DRAM) integrated circuit, a memory integrated with a combination of memory technologies. The memory may also be a fixed disk or other magnetic storage, or electrically erasable (EEPROM) storage. However, disk drive technology has generally slower access times than integrated circuit memories and therefore would not be used in a higher performance implementation.

Figure 4:
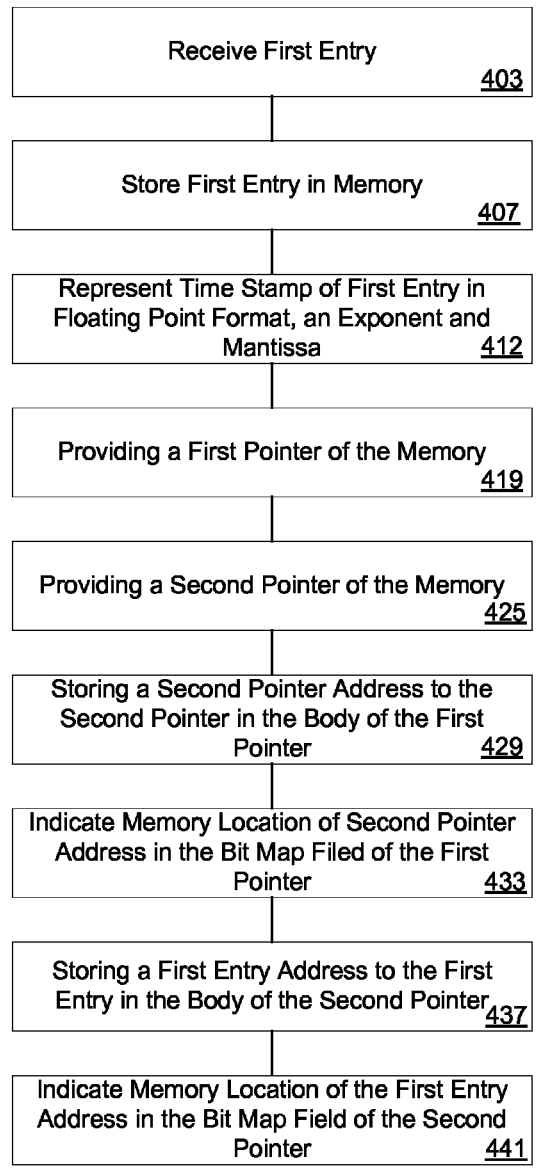
FIG. 4 shows a flow diagram of a technique of the invention.

FIG. 4 shows a flow diagram of a technique of the invention. The controller circuitry portion of the integrated circuit typically is used to implement this technique. The controller circuitry may include logic gates, state machines, registers, flip-flops, and others circuit used to implement logic.

In a step 403, the technique includes receiving a first entry to be stored in a memory location. The first entry has a time stamp value, represented in a floating point format, and a connection or data value, and may include other information. The information of the entry may sometimes be referred to as the payload. In a specific embodiment, this entry is a packet received over the network, and the time stamp is the time which the packet was received. As discussed above, the memory location may be on the same integrated circuit as the controller or a different integrated circuit.

In a step 407, the first entry will be stored in a position or location in the memory which is based upon its time stamp value. Any subsequent entries, such as second and third entries, will also be stored in positions or locations in the memory based upon their time stamp values. In an embodiment, the time stamp value is represented in a floating point format. One floating point format includes a mantissa (or fraction), an exponent, and an assumed radix (or base). For example, Floating Point Number=mantissa*(radix^exponent). The radix may be 2, 8, 10, 16, or any other number. The time stamp value, mantissa, and exponent may be signed or unsigned or represented in two's complement. Alternatively, in another floating point format, Floating Point Number=(1+mantissa/radix^a)*(radix^exponent), where the variable a can be any number. Many different representations can be used for floating point numbers, such as the IEEE (single-precision and double-precision), IBM, Cray Computer Corporation, Control Data Corporation, and DEC VAX formats. In addition, the time sample value may be expressed or approximately expressed by an exponential function. Any of these floating point representations may be used as a time stamp of the invention. However, in other implementations, the time stamp value may be represented in other numbering systems such as binary, octal, decimal, or hexadecimal.

In a step 412, when storing an entry into the memory, the time stamp is divided into at two portions or parts, the exponent and the mantissa. Depending on the specific application, the time stamp (e.g., the exponent and the mantissa) may be any length. For example, the exponent may be 4 bits, 6 bits, 8 bits, 16 bits, 24 bits, or 32 bits or more. Independently of the exponent, the mantissa may be 4 bits, 6 bits, 8 bits, 16 bits, 24 bits, or 32 bits or more.

In a specific embodiment, the first entry is stored in the memory that is organized as a pointer memory. A pointer is a reference to another memory location. In particular, the pointer stores the address of another memory location. In a step 419, there will be a first pointer memory structure. This first pointer memory structure will be referenced using a first pointer address and will have a head and a body. The head will have a bit map field and a pointer-to-body field.

In a specific embodiment, the bit map field will have a single binary bit for each memory location in its body. In other embodiments, the bit map field may be represented in another format, such as octal or hexadecimal digits. Therefore, there will be n binary bits for a body having n memory locations. For example, if there are eight locations in the body, the bit map field will have eight bits. And the bit map field is used to uniquely identify one of the memory locations of the body. For example, the most significant bit (MSB) of the bit map field may be used to indicate a value is being stored in a first memory location body. The least significant bit (LSB) of the bit map field may be used to indicate a value is being stored in a last memory location (i.e., location n) of the body. If the MSB is bit 0, then bit 1 may be used to indicate a value is being stored in a second location. Other techniques for uniquely representing or identifying memory locations using a bit map field may be used. For example, the LSB may be used to indicate the first memory location, and the MSB used to indicate the last memory location.

Generally, the number of bits in the bit map field will be related to how the time stamp is divided. Specifically, if the exponent portion of the time stamp has n bits, then the bit map field to store that exponent of the time stamp will have $2^n$ (i.e., 2 to the exponent n) bits and there will also be $2^n$ memory locations for the pointer structure. If the mantissa of the time stamp has m bits, then the bit map field to store that mantissa portion of the time stamp will have $2^n$ bits and there will also be $2^n$ memory locations for the pointer structure. For example, if the exponent of the time stamp has 3-bits, then the bit map field to store the exponent will have $2^3$ or 8 bits. And, if the mantissa of the time stamp has 4 bits, then the bit map field to store the mantissa will have $2^4$ or 16 bits.

Figure 5:
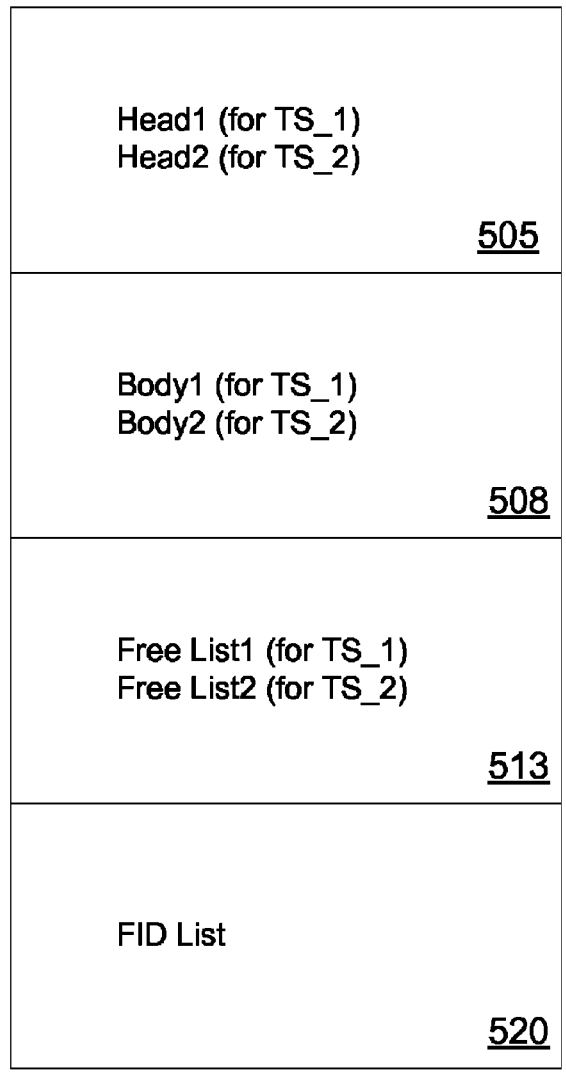
FIG. 5 shows an example of a memory map for a pointer memory.

FIG. 5 shows an example of how the memory is organized (i.e., memory map) to make a pointer memory. This memory can be SRAM, SDRAM, or even DRAM. An integrated multidimensional FPS may be implemented using any kind of memory technology. There is a section 505 of the memory allocated for heads of the pointers, a section 508 for bodies of the pointers, a section 513 for free list, and a section 520 for a connection value or flow ID (FID) list. In this figure, two different pointer heads are represented by head1 and head2. Two different pointer bodies are represented by body1 and body2. Two different free lists are represented by free list1 and free list2. There is one connection value or FID list; however, in other embodiments, there may be a two or more connection value or FID lists (flow ID lists).

Returning to FIG. 4, in a step 425, a second pointer memory structure is provided. The second pointer memory structure is similar to that discussed above for the first pointer memory structure. However, the bit map field for the second pointer memory structure may or may not have the same number of the bits as the first pointer memory structure. The reason is similar to that discussed above for how the exponent and the mantissa portions of the time stamp may each have any number of bits depending on the specific application. The second pointer memory structure is referenced using a second pointer address and has a head and a body. The head has a bit map field and a pointer-to-body field. As indicated by a step 429, the second pointer address is stored at a location in the body of the first pointer memory structure based on the exponent of the time stamp.

In step 433, as was discussed above, the location of the second pointer address is indicated in the bit map field of the head of the first pointer memory structure. The first entry address, in step 437, is stored at a location in the body of the second pointer memory structure based on the mantissa of the time stamp. As shown in step 441, the location of the first entry address is indicated in the bit map field of the head of the second pointer memory structure.

The steps above are for storing a single time stamp into memory. The technique may be extended to have as many steps (similar to steps 403 to 441 repeated) and pointers as needed to store additional time stamps into memory.

The technique of FIG. 4 merely illustrates the flow of one particular implementation of the invention. As one of skill in the art will recognize, there are many possible variations and alternatives of the approach described in above, and any of these variations may be used. For example, the second pointer address can be stored in the first pointer memory structure based on the mantissa portion of the time stamp; and, the first entry address can be stored at a location in the body of the second pointer memory structure based on the exponent portion of the time stamp.

After entries are stored using the above flow, they may be easily retrieved in out of the memory according to a sorted order. For example, the entries may be retrieved by minimum or lowest time stamp or maximum or greatest time stamp. A more detailed example of retrieving an entry with a specific time entry stamp is discussed below.

This invention provides a technique of searching or sorting information. Assume for some application, we need to have M sorters to sort N entries' values, which we can call "time stamp" or "TS." For example, sorter 1 can sort N_1 time stamps, sorter 2 can sort N_2 time stamps, sorter 3 can sort N_3 time stamps, and so forth. Therefore, sorter M can sort N_M time stamps. N_1+N_2+N_3+ . . . +N_M=N. However, each sorter can also sort up to N time stamps. For example, N_I=N while N_2=N_3= . . . N_M=0.

As the example shown above, the goal of this invention is to build an integrated sorter in one single data structure. The requirements are as follows. (1) M sorters, which can call "ports." (2) Each port can sort (or search the minimum or maximum TS) up to N time stamps. (3) Each sorter's TS cannot be mixed with other sorter's TS.

For single sorter, people use binary tree or heap algorithms to sort. For example, to sort 256 time stamps, if using radix=2 (where each binary tree node compares 2 TS), it takes 8 comparisons (since 2^8=256) to find the minimum or maximum TS. If using radix 4 (where each binary tree node compares 4 TS), it takes 4 comparisons (since 4^4=256) to find the minimum or maximum TS.

For a multiple dimensional sorter, there are no good existing solutions. A straightforward approach is to duplicate the approaches used for a single sorter. However, existing sorting schemes can not be implemented in an efficient way, the main drawbacks are as follows. They require expensive hardware (e.g., many comparators). There needs to be at least O(log N) operations to find the minimum or maximum TS, where N is the number of TS needs to be sort.

This application provides a brief description of the invention and includes a discussion of how it accomplishes what it does. This application has examples and drawings. This novel sorting scheme is based on the following concepts.

Represent each time stamp in floating point format, an exponent "e" and a mantissa "m." In one embodiment, $TS(w)=m(w)*radix^{e(w)}$, where $0 \leq e(w) \leq e\_max$. The radix may be 2, 8, 10, 16, or any other number. Depending on the specific application, e_max in the above equation can be fixed or user-defined. As stated above, e(w) may be 4 bits, 6 bits, 8 bits, 16 bits, 24 bits, or 32 bits or more. Its first bit is the most significant bit (MSB) (or the LSB if so desired). The mantissa, m(w) may be 4 bits, 6 bits, 8 bits, 16 bits, 24 bits, or 32 bits or more. Its first bit is the most significant bit (MSB) (or the LSB if so desired).

Each e(w) and m(w) composes of head and body. The head has two parts, bit map and pointer_to_body (PB). The bit map for the exponent has e_max bits. Each bit represents the status of the corresponding pointer in the body. For example, if bit 12 is asserted, then pointer 12 in the body is a valid pointer. Note that the bit map can also be decoded or compressed, but this may require more logic to handle the decoding or compression. For an integrated circuit embodiment, this would add additional circuitry and would increase the die size, which is generally undesirable.

The PB can be used as memory pointer to the body of that TS layer. The body contains the pointers to the next TS layer. Note that the head and body can be combined to one block or separated (e.g., two or more different memory locations). Each TS's pieces will be decoded and then populated in its corresponding TS layer.

Figure 6:
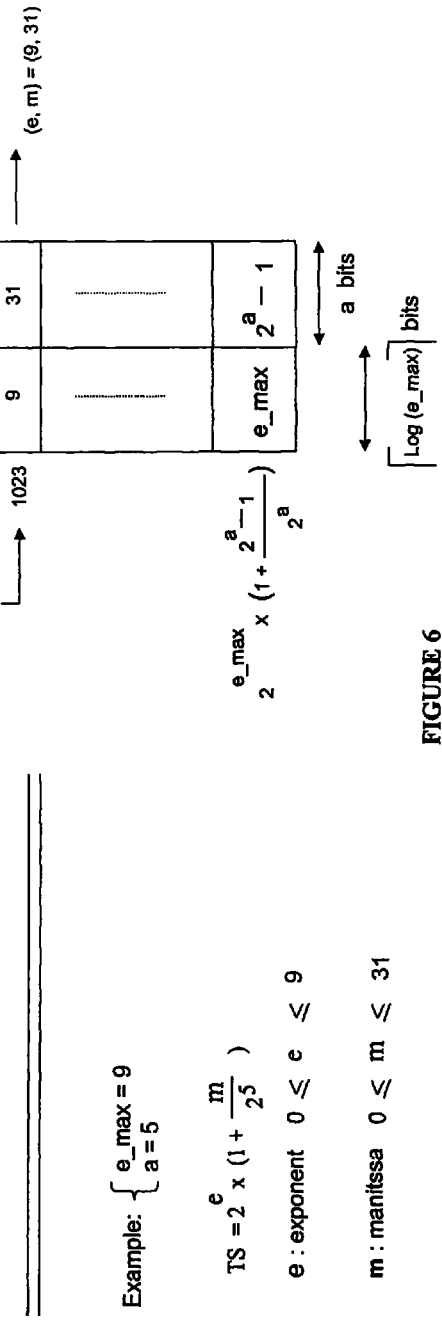
FIG. 6 shows a more detailed example of a technique of determining a time entry stamp in floating point format

FIG. 6 shows a detailed example of a technique of determining the floating point representation (e.g., Floating Point Number=$(1+\text{mantissa}/radix^a)*(radix^{\text{exponent}})$, where variable a can be any number) of a time stamp entry using a lookup table. FIG. 6 shows an example of a floating point representation of TS=1,023 as (e, m)=(9, 31).

Figure 7:
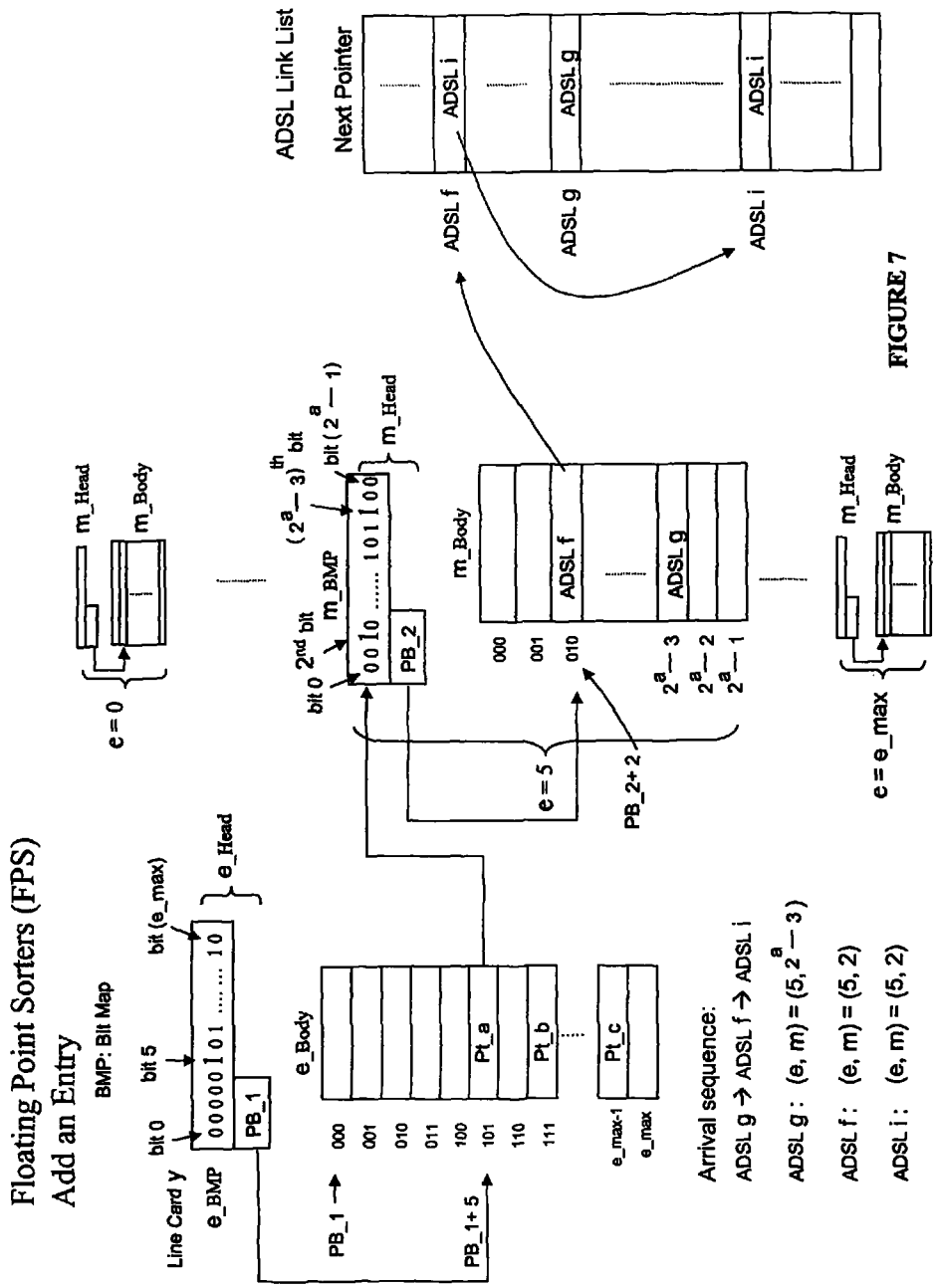
FIG. 7 shows the pointers after adding the time stamp.

FIG. 7 shows an example of adding a TS entry. The bit map for the exponent portion of the time stamp is e_max bits, and contains e_max pointers in body, while the bit map for the mantissa portion of the time stamp is $2^a-1$ bits, and contains $2^a-1$ pointers in body. Although FIG. 7 illustrates three bit addresses for e_Body and m_Body, the number of address bits can be any number, including without limitation 4, 5, 6, 7, 16, 32, 64, and so forth.

The operations are as follows.

Operations on the first layer, in this example the exponent portion of the time stamp: Use the line card y as a pointer to find the bit map and PB (pointer_to_body) in the head of first TS layer. For ADSL i entry (e, m)–(5, 2), the exponent value equals 5.

Case A: If bit_S location in the bit map for the exponent portion of the time stamp is 1, that means there is another TS entry with the same exponent value. Use PB+S as the address to read out pointer in body. This is the pointer to next TS layer, in this example the mantissa portion of the time stamp.

Case B: If bit_S location in the bit map is 0, that means no other TS entry has the same exponent value. In this case, we need to add TS to the sorter starting from the current layer. We need to get a pointer (e.g., Pt_a in FIG. 7) from a free list (see memory map of FIG. 5), and use PB+5 as the address to store it in body, this is the pointer to next TS layer. Finally we need to set the bit_S location in the bit map to 1 to indicate there is a corresponding TS entry whose exponent value is 5. As an alternative embodiment, the free list would not be needed if fixed mapping is used; for example, if Pt_a in FIG. 7 is the same fixed location in memory.

Operations on the second layer: Use the Pt_a as address to find the bit map and PB (pointer_to_body) in the head of second TS layer. For ADSL i entry (e, m)–(5, 2), the mantissa value equals 2.

Case A: If bit_2 location in the bit map is 1, that means there is another TS entry with the same mantissa value. Use PB+2 as the address to read out pointer in body. This is the pointer to TS entries with the same floating point representation. In this example, later arriving time entries with the same floating point representations are associated by a link list. For example, the time stamp entry for ADSL f is linked to later arriving ADSL i in the link list.

Case B: If bit_1 location in the bit map is 0, that means no other TS entry has the same mantissa value. In this case we need to add TS to the sorter, starting from the current layer. We need to get a pointer from a free list, and use PB+2 as the address to store it in body, this is the pointer to the TS entry. Finally we need to set the bit_2 location in the bit map to 1, to indicate there is a corresponding TS entry whose mantissa value is 2. The adding procedure is now completed. In an alternative embodiment, the free list may not be needed if fixed mapping is used, for example, if the ADSL index in FIG. 7 is used as the address to map to the ADSL link list.

Returning to FIG. 5, specifically, there are two TS pieces, TS_1 (exponent) and TS_2 (mantissa). Each piece has Head and Body. Besides, we have individual Free List to maintain the pointer (if the bit map of Head in that TS piece is 0, we will get a pointer from Free List, and store it back to the body using (PB (pointer to body)+bit_location as address)). Finally, we have FID list (Flow ID list) to maintain connection (or Flow ID) Link List. Different connections with same TS will be associated by the link list.

Figure 8:
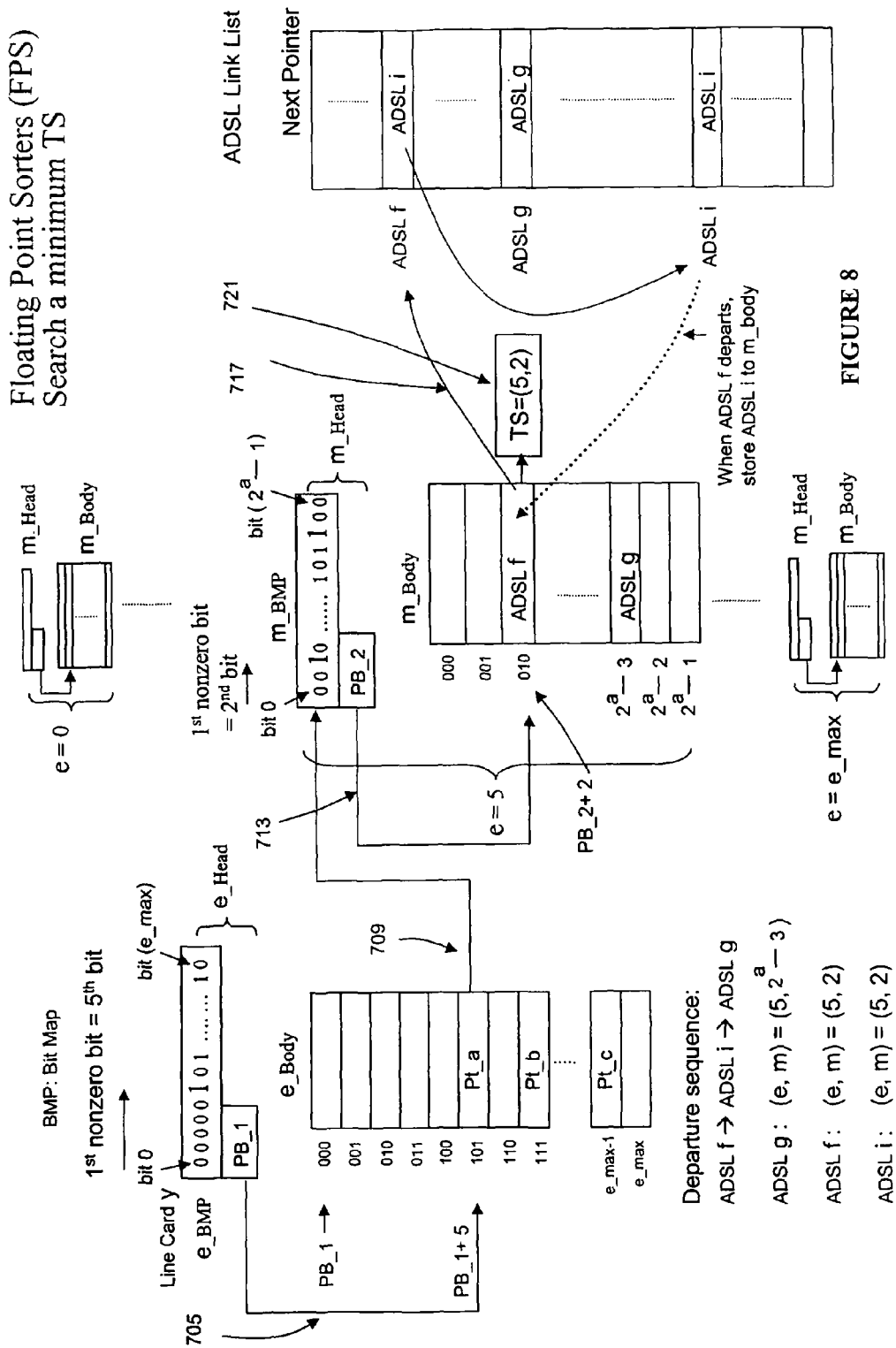
FIG. 8 shows a more detailed example of searching for a minimum time entry stamp.

FIG. 8 shows a more detailed example of searching for a minimum time entry stamp. The data flow is indicated by arrows 705, 709, 713, and 717. The result is shown by box 721. Although this example shows searching for a minimum time stamp, a maximum time stamp may be searched for using a similar technique. More specifically, instead of starting with the MSB, start at the LSB first. In addition, FIG. 8 illustrates three bit addresses for e_Body and m_Body, however, the number of address bits can be any number, including without limitation 4, 5, 6, 7, 16, 32, 64, and so forth.

When searching minimum TS, the operations are as follows. Use the line card y as a pointer to find the bit map and PB (pointer_to_body) in the head of first TS layer. Find the first_non-zero bit_location. Use PB+first_non-zero_bit_location as the address to read out pointer in body. This is the pointer to next TS layer. In the example, the first_non-zero_bit_location is "000001," and the corresponding pointer is Pt_a.

Use the Pt_a as address to find the bit map and PB (pointer_to_body) in the head of second TS layer. Find the first_non-zero_bit_location. Use PB + first_non-zero_bit_location as the address to read out pointer in body. This is the pointer to a time entry and link list. In the example, the first_non-zero_bit_location is "001," and the entry is ADSL f, which is linked to the next entry ADSL i.

As a result of these operations, the minimum TS can be found based on e=5 and m=2. In this example, after ADSL f is selected and departs, ADSL i, the new head of line of the link list for floating point time stamp (5, 2), is stored to m_Body at location 010.

FIGS. 9A, 9B, 9C, and 9D show four different versions of pointer structures which may be used to implement the invention. Depending on the particular implementation or application, each version has some special benefits. As described above, each time stamp (TS) piece has two parts, head and body. These can be combined to have one part or separate parts. To illustrate this concept clearly, FIGS. 9A, 9B, 9C, and 9D show that there is total four versions of head and body structure that may be implemented.

Figure 9A:
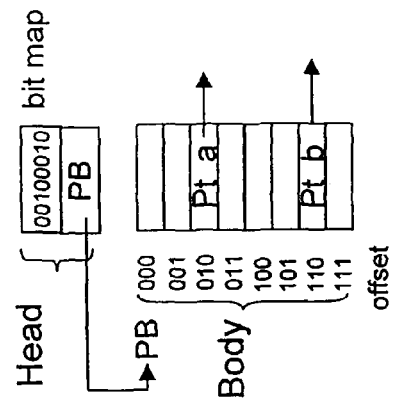
FIGS. 9A, 9B, 9C, and 9D show four different versions of pointer structures.

FIG. 9A shows version 1. The head and body are combined into one part, so there is no need for a pointer to point to the body location.

Figure 9B:
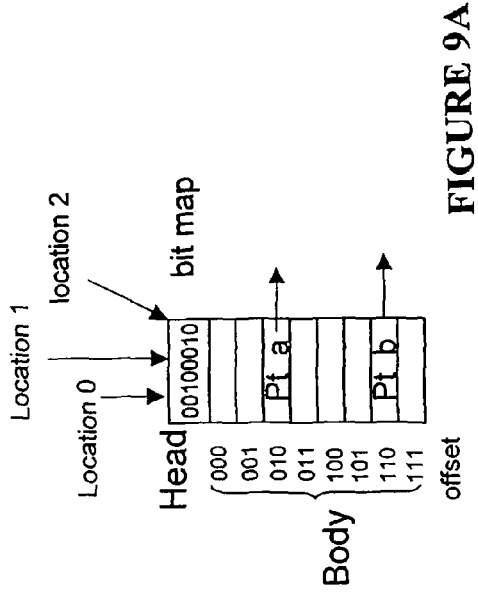

FIG. 9B shows version 2. This version has separate head and body. A pointer (PB) to point to the body location is needed.

Figure 9D:
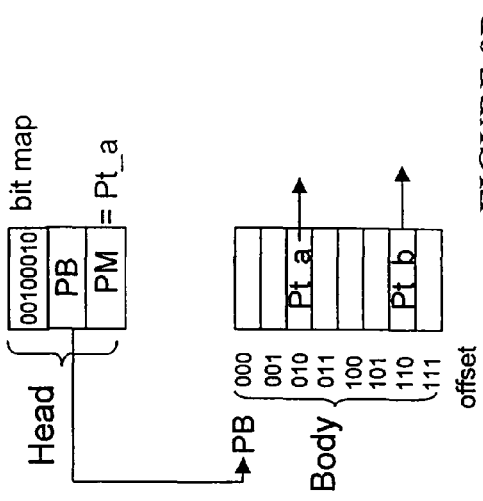
Figure 9C:
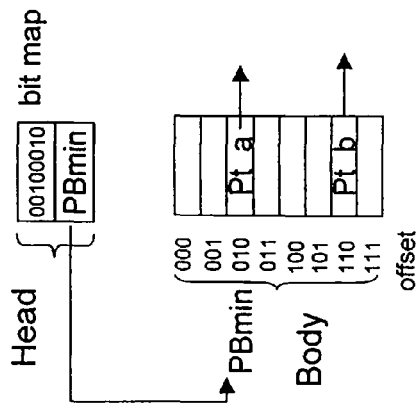

FIG. 9C shows version 3. This version also has separate head and body. There is a special pointer called PBmin which points to the location which has first valid pointer existing in the body.

FIG. 9D shows version 4. This version also has separate head and body. There are two pointers in the head, PB and PM. The PB pointer points to first location of the body. The PM pointer which value equals to first valid pointer in the body. For example, in FIG. 9D, PM=Pt_a.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   upon receiving a first packet of information on a first port, storing a first time stamp, represented in a floating point format, and a first connection value in a first entry of a first sorter,
   wherein an exponent component of the first time stamp is stored at a first memory location, and a mantissa component of first time stamp is stored at a second memory location, a first memory structure comprising the first memory location points to an address of the second memory location;
   upon receiving a second packet of information on the first port, storing a second time stamp, represented in a floating point format, and a second connection value in a second entry of the first sorter;
   upon receiving a third packet of information on a second port, storing a third time stamp, represented in a floating point format, and a third connection value in a first entry of a second sorter; and
   upon receiving a fourth packet of information on the second port, storing a fourth time stamp, represented in a floating point format, and a fourth connection value in a second entry of the second sorter.

2. The method of claim 1 wherein first sorter and the second sorter are contained on an integrated circuit.

3. The method of claim 1 comprising:
   accessing a lookup table of values, wherein the lookup table has
      a plurality of rows, each row representing a time stamp value,
      a first column, representing an exponent for a floating point representation of a time stamp value for a row, and
      a second column, representing a mantissa for a floating point representation of a time stamp value for a row.

4. The method of claim 1 wherein the first sorter is implemented using a first pointer memory structure, referenced using a first pointer address and having a head and a body, wherein the head comprises a bit map field comprising n bits and the body comprises n memory positions, each bit in the bit map field representing one of the n memory positions.

5. The method of claim 1 wherein the first time stamp value represented in a floating point format comprises mantissa and exponent components.

6. The method of claim 4 wherein the head is stored separately from the body.

7. The method of claim 1 wherein the first and second entries placed in the first sorter are sorted according to the first and second time stamps, and the third and fourth entries placed in the second sorter are sorted according to the third and fourth time stamps.

8. The method of claim 7 wherein the first and second entries are sorted so an entry with the earlier time stamp is placed before the entry with a later time stamp.

9. An integrated circuit comprising:
   a first sorter block portion of the integrated circuit comprising N(1) entries, wherein each entry comprises a connection value and a time stamp value, represented by an mantissa and exponent, the mantissa and exponent being stored are at different memory address locations in a memory, entries in the first sorter block are sorted according to their time stamp value, and the number of entries N(1) is user-selectable; and a second sorter block portion of the integrated circuit comprising N(2) entries, wherein each entry comprises a connection value and a time stamp value, represented by an mantissa and exponent, entries in the second sorter block are sorted according to their time stamp value, and the number of entries N(2) is user selectable.

10. The integrated circuit of claim 9 wherein each entry in the first sorter block is placed at a location based on its time stamp value, and each entry in the second sorter block is placed at a location based on its time stamp value.

11. The integrated circuit of claim 9 wherein the entries are stored in a random access memory portion of the integrated circuit.

12. An integrated circuit comprising:
  first control circuitry to implement a first sorter block comprising N(1) entries, wherein each entry comprises a connection value and a time stamp value, represented by a fraction multiplied by a power of a number base indicated by an exponent, a value of the exponent is stored in a lookup table, entries in the first sorter block are sorted according to their time stamp value, and the number of entries N(1) is user-selectable; and
  second control circuitry to implement a second sorter block comprising N(2) entries, wherein each entry comprises a connection value and a time stamp value, represented by a fraction multiplied by a power of a number base indicated by an exponent, entries in the second sorter block are sorted according to their time stamp value, and the number of entries N(2) is user-selectable.

13. The integrated circuit of claim 12 wherein the entries for the first and second sorter blocks are stored in another integrated circuit comprising random access memory.

14. The integrated circuit of claim 12 wherein each entry in the first sorter block is placed at a location based on its time stamp value, and each entry in the second sorter block is placed at a location based on its time stamp value.

15. The method of claim 4 wherein the head comprises a pointer to body field pointing to a first entry of the body.

16. The method of claim 4 wherein head comprises a pointer to body field pointing to a first entry of the body where a valid pointer is stored.

17. The method of claim 4 wherein the head and body are store stored in combined structure in consecutive memory locations.

18. The integrated circuit of claim 9 comprising:
  a lookup table of values, wherein the lookup table has
    a plurality of rows, each row representing a time stamp value,
    a first column, representing an exponent for a floating point representation of a time stamp value for a row, and
    a second column, representing a mantissa for a floating point representation of a time stamp value for a row.

19. The integrated circuit of claim 9 wherein the first sorter block portion comprises a first pointer memory structure, referenced using a first pointer address and having a head and a body, wherein the head comprises a bit map field comprising n bits and the body comprises n memory positions, each bit in the bit map field representing one of the n memory position.

20. The integrated circuit of claim 12 wherein the sorter block comprises a first pointer memory structure, referenced using a first pointer address and having a head and a body, wherein the head comprises a bit map field comprising n bits and the body comprises n memory positions, each bit in the bit map field representing one of the n memory positions.

* * * * *